United States Patent [19]

Pohjola

[11] 3,938,607

[45] Feb. 17, 1976

[54] VEHICLE STEERING APPARATUS

[76] Inventor: Jorma Toivo Tapani Pohjola, Vaskitie 8, 90250 Oulu 25, Finland

[22] Filed: Jan. 23, 1974

[21] Appl. No.: 435,750

[30] Foreign Application Priority Data
Jan. 26, 1973   Finland.................................. 231/73

[52] U.S. Cl.................................. 180/9.44; 280/101
[51] Int. Cl.²......................................... B62D 11/20
[58] Field of Search................... 180/9.44, 9.46, 6.6; 305/27, 29, 30, 31, 32, 44; 280/101

[56] References Cited
UNITED STATES PATENTS

| | | | |
|---|---|---|---|
| 502,419 | 8/1893 | Lenarz.............................. | 280/101 |
| 689,314 | 12/1901 | Koon................................. | 280/101 |
| 1,295,093 | 2/1919 | Healy................................ | 180/9.44 |
| 2,151,287 | 3/1939 | Bleichert........................... | 180/9.44 |
| 2,356,528 | 8/1944 | Mette................................ | 180/9.44 |
| 3,548,962 | 12/1970 | Best.................................. | 180/9.44 |
| 3,565,198 | 2/1971 | Ames................................ | 180/9.44 |

Primary Examiner—Philip Goodman
Assistant Examiner—John A. Carroll
Attorney, Agent, or Firm—Steinberg & Blake

[57]   ABSTRACT

A vehicle steering apparatus for a vehicle which has an endless track guided around front and rear rolls. When executing turns substantially larger than the minimum radius of turning of the vehicle, at least the front roll together with the front end of the track are turned to provide for relatively large turns where the rate of turning at the front of the vehicle is greater than the rate of turning at the rear thereof. The front and rear rolls are supported for swivelling movement about substantially upright axes and in one construction of the invention a transmission is connected between the supports for the front and rear rolls to bring about turning of the rear roll and the rear end of the track therewith only after the front roll and the front end of the track therewith have turned through a given angle.

3 Claims, 7 Drawing Figures

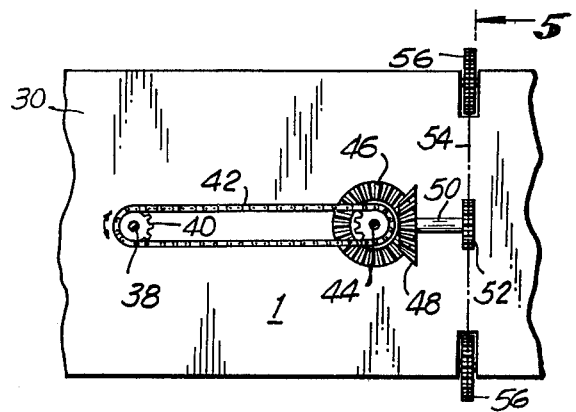
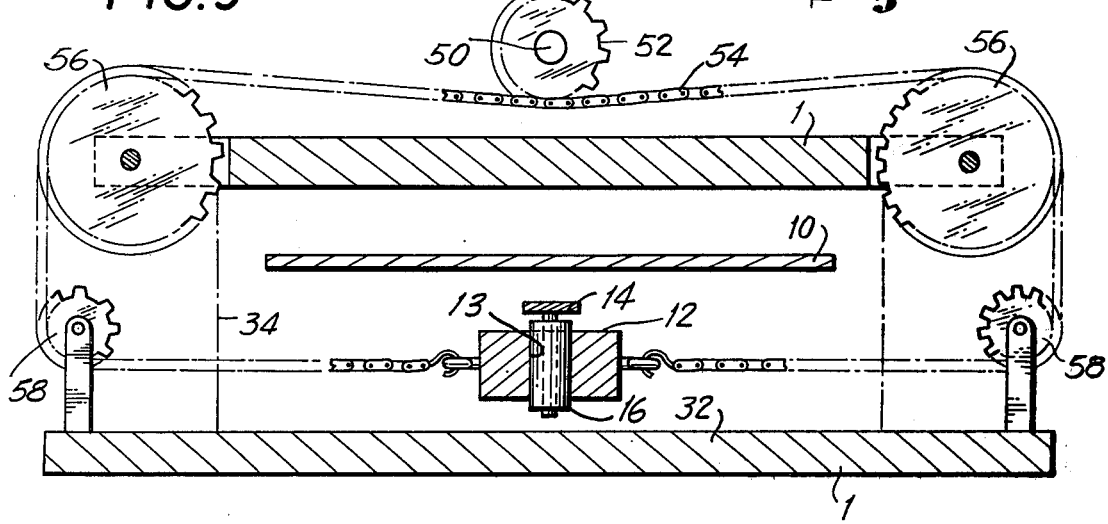
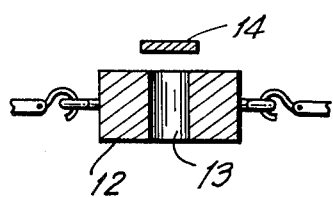
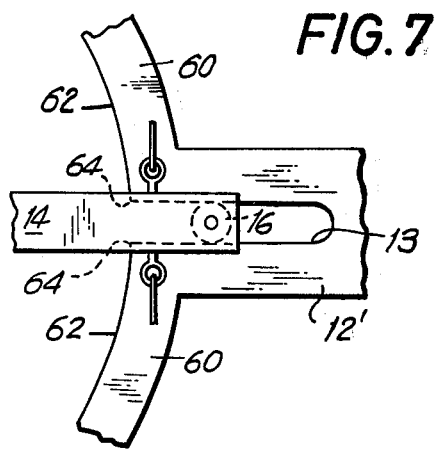

VEHICLE STEERING APPARATUS

BACKGROUND OF THE INVENTION

The present invention relates to vehicles.

In particular, the present invention relates to that type of vehicle which includes an endless track guided around front and rear rolls.

The present invention relates especially to apparatus for steering a vehicle of this type.

Thus, the present invention relates to that type of vehicle where the endless track becomes longer on one side and correspondingly shorter on the other side, in response to turning of one or both of the end rolls around which the track is guided, in order to enable the vehicle to execute the turns with the endless track assuming a curved configuration during turning of the vehicle.

It has already been proposed to provide for steering of a vehicle of the above type by swivelling the front and rear end rolls through substantially equal angles when executing partial turns as well as when turning the vehicle along its mimimum turning radius. However, experience has shown that this type of vehicle steering is not entirely satisfactory in all respects, particularly with respect to the directional stability of the vehicle, which is to say the stability with which it is possible to steer the vehicle. Thus, with vehicles of the above type when the front and rear end rolls together with the front and rear ends of the track are turned through substantially equal angles it has been found that it is not possible to maintain desired control of the vehicle particularly at speeds which are comparatively high for a vehicle of the above type.

SUMMARY OF THE INVENTION

It is accordingly a primary object of the present invention to provide a vehicle steering apparatus which will avoid the above drawbacks.

Thus, it is a more particular object of the present invention to provide apparatus which will enable a vehicle of the above type to be turned through angles substantially larger than the minimum turning radius in a highly stable manner which will enable the directional control to be maintained in a stable fashion even when the vehicle travels at relatively high speeds.

Also it is an object of the invention to provide apparatus capable of achieving the above objects while remaining relatively simple and rugged so as to be equal to the forces and stresses which are encountered during turning of a vehicle of the above type.

In accordance with the invention the front end of the endless track together with the front end roll means around which the front end of the track is guided are turned when executing turning radii substantially larger than the minimum turning radius of the vehicle, so as to provide an angular turning rate at the front end of the vehicle which is higher than the angular turning rate at the rear end of the vehicle when executing relatively large turns.

BRIEF DESCRIPTION OF DRAWINGS

The invention is illustrated by way of example in the accompanying drawings which form part of this application and in which:

FIG. 4 is schematic partly sectional top plan view of one possible embodiment of a turning means carried by the vehicle for turning at least the front end roll means;

FIG. 5 is a schematic transverse sectional elevation taken along line 5-5 of FIG. 4 in the direction of the arrows to show further details of the turning means;

FIG. 6 is a fragmentary schematic elevation of part of the structure of FIG. 5 showing a variation of the invention according to which only the front end roll means is turned; and FIG. 7 is a schematic plan view of part of the structure of FIG. 3 showing a variation which makes it possible to bring about turning of the rear roll means only after the front roll means has turned through a given angle.

DESCRIPTION OF PREFERRED EMBODIMENTS

Figure 1:
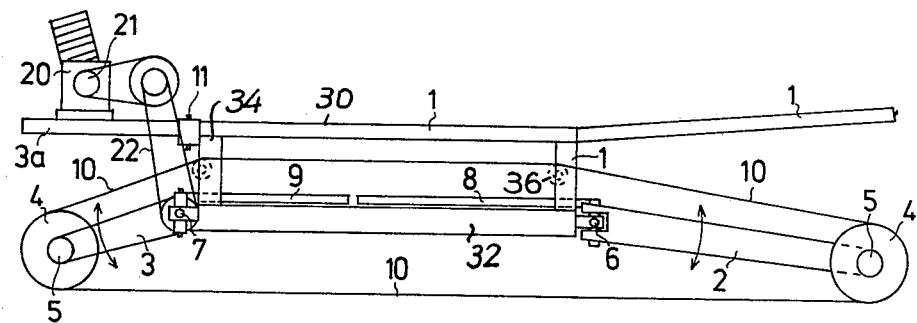
FIG. 1 is a schematic side elevation of a vehicle according to the present invention
Figure 2:
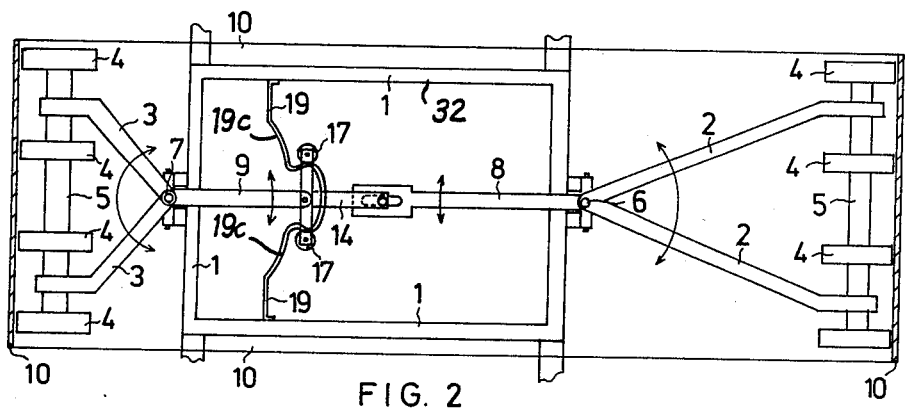
FIG. 2 is a schematic plan view of the vehicle of FIG. 1 taken in a plane just above the supporting frames for the front and rear end rolls.

Referring to FIG. 1, the vehicle illustrated therein includes a chassis 1 in a form of a suitable framework including an upper platform and a structure carried thereby for partially supporting and guiding an endless track means 10. Thus it will be seen that the chassis 1 includes the upper platform 30 which is situated in a substantially horizontal plane over a lower platform or rectangular frame 32 which is also situated in a substantially horizontal plane beneath the platform 30. Suitable uprights 34 extend between and are fixed to the platforms 30 and 32 and carry guides such as rollers 36 for the endless track 10 which travels freely between the uprights 34 which are situated adjacent the opposed sides of the chassis as well as between the upper and lower platforms 30 and 32 thereof, as illustrated. The endless track 10 does not in itself form part of the present invention. It is composed of elements which enable the track 10 to behave in a known way so that when executing turns one side of the track 10 will become elongated in response to turning of one or both of the end roll means 4, while the other side of the track 10 will become correspondingly shortened. In this way the track 10 is capable of assuming a curved configuration when the vehicle executes turns. Thus FIGS. 1 and 2 illustrate at the right and left, respectively, front and rear end roll means 4 around which the endless track means 10 is guided at its front and rear ends, respectively. The front roll means 4 is supported for swivelling movement about a substantially upright axis by way of a support means 2 in the form of a framework having suitable arms which carry the front shaft 5 on which components of the front end roll means 4 are supported. In the same way the rear end roll means 4 is supported for swivelling movement by a rear support means 3 which includes suitable arms carrying the rear shaft 5 on which the components of the rear end roll means 4 are supported. For providing the swivelling movement the front support means 2 is carried by a universal joint 6 having a component carried by the front end of the frame 32 and turnable about a horizontal axis and a vertical component carried by the component which is turnable about the horizontal axis with the vertical component extending through suitable openings of a rear fork-shaped end of the frame 2 so that the latter is in this way supported for swivelling movement about a substantially vertical axis, as is apparent from FIGS. 1 and 2. The horizontally extending component of the universal joint 6 enables the front support means 2 to turn to a limited extent about a horizontal axis as by a suitable torsion bar construction.

In the same way, the rear support means 3 has a front end supported by a universal joint 7 carried by the rear end of the frame 32 of the chassis 1. This universal joint 7 also includes a horizontal component carried directly by the rear end of the frame 32 to provide for limited swinging of the frame 3 about a horizontal axis while the universal joint 7 has a vertical component carried by its horizontal component and extending through suitable openings at the front end of the frame 3 so as to support the latter for swinging or swivelling movement about a substantially vertical axis. The limited swinging movement of the frame 3 about a horizontal axis may be provided by way of a suitable spring structure such as a suitable torsion bar structure as is the case with the front support means 2. These possible movements of the front and rear support means 2 and 3 are schematically designated by the double-headed arrows in FIGS. 1 and 2.

The chassis 1 includes a rear extension 3a of the upper platform 30 connected at its front end to the rear end of the upper platform 30 by way of a pivot 11 so that it is possible for the rear extension 3a to turn about a vertical axis which substantially coincides with the upright swivelling axis provided by the universal joint 7. It is this rear extension 3a which carries the driving engine 20 which through suitable sprocket wheels 21 and chains 22 schematically illustrated in FIG. 1 transmits the rotary propelling force of the vehicle to the rear end roll means 4. Thus when the rear end roll means 4 turns the platform 3a can turn freely therewith so that there is no problem in connection with transmitting the propellant force of the vehicle from the engine 20 to the rear end roll means 4 even when the vehicle executes turns.

In accordance with the present invention it has been found to be most advantageous to steer the vehicle by turning the front end of the endless track means 10 at least when executing turns of comparatively large radii, providing in this way a greater angular rate of turning at the front of the track means 10 than at the rear of the track means 10. According to one particular embodiment of the invention the front end of the track means 10 is swivelled up to a given angle, the angle β shown in FIG. 3, while the rear end of the track means 10 is kept straight without any turning of the latter, so that during the initial turning at a relatively large turning radius only the front end roll means 4 and the front end of the track therewith are turned. After turning through this initial angle, such as the angle β in FIG. 3, turning of the rear end roll means 4 is started so that when turning beyond the angle β the rear end roll means 4 participates in the turning together with the front end roll means. In this way during initial relatively large turning radii only the front end roll means and the front end of the track therewith are turned while at the smaller turning radii the rear end roll means and the rear end of the track turn together with the front end of the track. In this way it is possible to achieve the advantage of steering the vehicle when it is travelling along a highway at relatively high speeds for a vehicle of this type either exclusively or predominantly by swivelling the front end of the endless track 10. This type of apparatus has been found from experience to provide a good directional stability for the vehicle enabling the latter to behave in a controlled manner even at the above speeds which are comparatively high for a vehicle which travels on an endless track as illustrated. However, it is also possible in accordance with the invention to provide a steering apparatus according to which the steering of the vehicle is brought about exclusively by turning the front end of the track means 10 and the front end roll means 4. Also, in accordance with the invention it is possible to provide apparatus according to which when executing turns at relatively large turning radii and relatively high speeds the vehicle is steered in such a way that the front end of the track means 10 together with the front end roll means 4 are turned up to a given maximum angle while when it is desired to reduce the turning radius still further the rear end of the track 10 together with the rear end roll means 4 are also turned while the front end roll means 4 and the front end of the track 10 are not turned further, so that they remain in the extreme position to which they have been turned during the initial turning of relatively large radius.

Figure 3:
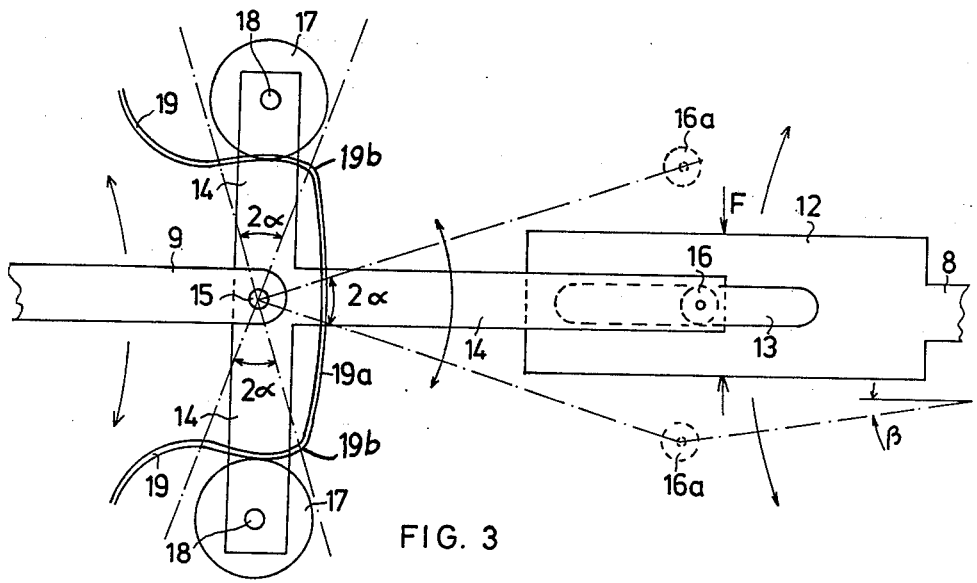
FIG. 3 is a schematic representation at an enlarged scale, as compared to FIG. 2, of the transmission means which is connected between the front and rear support means for the front and rear end roll means around which the track means is guided.

Various types of constructions are available for bringing about steering of a vehicle in accordance with the invention, and the specific details of one possible structure are illustrated in FIGS. 1–3. Thus it will be seen that the rear end of the support means 2 includes an elongated arm 8 which is turnable together with the remainder of the support means 2 around the upright swivelling axis provided by way of the universal joint 6 as described above. This rearwardly extending arm 8 of the front support means 2 forms a steering rod which has an enlarged rear end portion 12 formed with a longitudinally extending slot 13, so that in this way this structure provides the equivalent of a fork.

In the same way, the rear support means 3 includes an elongated longitudinally extending arm 9 which is fixed to the remainder of the rear support means 3 so as to swivel therewith about the substantially upright swivelling axis formed by the universal joint 7. The front end of the arm 9 of the rear support means 3 is pivotally connected by way of a pivot 15 to a transmission means 14 which is interconnected between the front and rear support means 2 and 3, with the pivot axis provided by the pivot 15 being situated midway between the pair of rear rollers 17 which are supported for free rotary movement on a pair of pins 18 carried by a rear transverse arm of the transmission means 14. It will be noted that the transmission means 14 has a substantially T-shaped configuration with the rear transverse arm thereof carrying the rollers 17. A forwardly extending arm of the tranmission means 14 carries at the region of its front end a front roller 16 which is received in the slot 13. Thus the rollers 16 and 17 are situated at the corners of a triangle and the transmission means 14 is the equivalent of triangular structure which carries the rollers 16 and 17 at the corners of the triangle.

The frame 32 fixedly carries a guide means 19 which guides the rollers 17.

In order to bring about turning of the vehicle a turning means is operatively connected according to one embodiment of the invention to the arm 8 or the enlarged part 12 thereof. Thus, as may be seen from FIG. 4, the chassis 1 can carry above the platform 30 thereof a vertical shaft 38 which can carry at its top end a suitable steering wheel accessible to the operator with the shaft 38 being supported for turning about its vertical axis in any suitable way. The shaft 38 carries a sprocket wheel 40 which transmits the turning movement to a sprocket chain 42 which drives a further sprocket wheel fixed to a vertical shaft 44 supported for turning movement about its axis on the platform 30. The shaft 44 fixedly carries a bevel gear 46 which drives a bevel gear 48 supported on a shaft 50 for turning movement about a horizontal axis, and the shaft 50 drives a sprocket wheel 52 which in turn drives a chain 54.

As may be seen from FIGS. 4 and 5, the chain 54 is guided around a pair of lateral sprocket wheels 56 supported for free rotary movement on suitable pins carried by the platform 30 in the manner illustrated in FIGS. 4 and 5, and the chain 54 is then guided around further sprockets 58 supported in any suitable way on uprights extending upwardly from the lower platform 32 supported from the upper platform by the uprights 34 as schematically illustrated. The chain 54 extends from the lower rollers 58 to a pair of eyes or the like fixed to the opposed sides of the portion 12 of the arm 8, so that in this way when the sprocket wheel 52 is turned in one direction or the other a turning force will be applied to the arm 8 to bring about steering of the vehicle.

Assuming now that the above-described turning means shown in FIGS. 4 and 5 acts on the arm 8 to provide a turning or steering force F at the thicker part 12 of the arm 8, for example, then while the arm 8 turns through the angle $\beta$ the transmission means 14 will turn about the axis provided by the pivot 15 through an angle $\alpha$. The angle $2\alpha$ is shown in FIG. 3 to indicate twice the angle through which the transmission means 14 turns while the arm 8 turns through the angle $\beta$. In other words while the vehicle travels straight, without any turning, the arms 8 and 9 as well as the longitudinal leg of the transmission means 14 are all in line with each other. Initially the rollers 17 engage arcuate portions of the guide means 19 which extend along a circle whose center is in the axis provided by the pivot 15. Therefore during the initial turning of the arm 8 the transmission means 14 will turn about the pivot 15 with the rollers 17 riding along the arcuate portions of the guide means 19 which extend along a circle whose center is in the axis of the pivot 15, so that at this time even though the transmission means 14 swings the arm 9 does not turn and the rear roll means 4 as well as the rear end of the track means 10 do not turn while the front end roll means 4 and the front end of the track means 10 turn in response to turning of the support means 2 together with the arm 8 thereof.

The arm 8 is capable of turning in one direction or the other through the angle $\beta$ until the roller 16 reaches either of the positions 16a shown in dotted lines in FIG. 3. At this time the longitudinal arm of the transmission means 14 will assume one or the other of the dot-dash line positions, and the rear transverse arm which carries the rollers 17 will reach one or the other of the dot-dash line positions which define the angle $2\alpha$. At this instant one or the other of the rollers 17 will reach one of the ends 19b of the elongated central portion 19a of the guide means 19 which extends between the arcuate portions thereof which extend along the circle whose center is in the axis of the pivot 15. During further turning of the front support means 2 one or the other of the rollers 17 will move transversely along the guide portion 19a of the guide means 19, and the remaining roller 17 will move along one or the other of the portions 19c of the guide means 19 (FIG. 2). As a result the point or axis of the pivot 15 will shift transversely with simultaneous turning of the arm 9 together with the arm 8 so that the rear end roll means 4 together with the rear end of the track means 10 will now participate in the steering of the vehicle. In the illustrated example, once the arm 9 starts to turn together with the remainder of the support means 3 about the swivel axis determined by the universal joint 7 the rear end roll means 4 will turn together with the rear end of the track means 10 at a greater rate than the front end roll means 4 and the front end of the track means 10 because in the illustrated example the arm 8 is longer than the arm 9. It is possible by selecting a suitable ratio between the lengths of the arms 8 and 9 to preselect the ratio between the angular turning rates of the front and rear ends of the track means 10 to be appropriate for a particular vehicle. Thus it is possible to provide a construction where the front end of the track means 10 and the front end roll means 4 will turn at a greater angular rate than the rear end roll means 4 and the rear end of the track, by suitable selection of the lengths of the arms 8 and 9.

Also, it is possible to provide a construction where the turning of the vehicle is brought about exclusively by turning of the front end roll means 4 and the front end of the track means 10. Thus, referring to FIG. 6 it will be seen that the construction illustrated therein is exactly the same as that shown in FIG. 5 except that the roller 16 has been omitted. As a result there is no connection of the transmission means 14 to the front support means 2, and thus when the turning means acts on the front support means 2 there will be no transmission back to the rear support means 3 which remains in the position shown in FIGS. 2 and 3 at all times. Thus simply by eliminating the roller 16 it is possible to provide a construction where all the turning is brought about exclusively by way of the front end roll means 4 and the front end of the track means 10.

Also, as was pointed out above, it is possible to provide a construction where once the front end roll means 4 and the front end of the track means 10 has been turned through a given angle, the continued turning is brought about exclusively by way of the rear end roll means 4 and the rear end of the track means 10. For this purpose, for example, it is possible to use a construction as shown in FIG. 7 where the part 12' at the rear of the front support means 2 has been modified by providing the slot 13 with a rear open end beyond which the roller 16 can move. Also the part 12' has a pair of laterally extending arms 60 provided with rear surfaces 62 along which the roller 16 will ride after moving beyond the slot 13. In this case the turning means shown in FIGS. 4 and 5 is connected directly to the transmission means 14 rather than to the part 12'. The parts are so designed that the roller 16 will reach the corners 64 at the rear end of the slot 13 at the instant when one or the other of the rollers 17 reaches one or the other of the ends 19b of the central portion 19a of the guide means 19. Thus, with this construction the front support means 2 will turn for example through the angle $\beta$ when further turning will cause the roller 16 to travel along one of the surfaces 62 while one or the other of the rollers 17 travels along the central guide portion 19a. In this way the front end roll means 4 and the front end of the track means will remain in the extreme position to which it has turned through the angle β and will not turn further while the continued turning force applied through the transmission means 14 will now act only on the arm 9 for turning the rear support means 3 to bring about the continued turning of the vehicle only by way of turning of the rear end roll means 4 and the rear end track means 10 therewith.

It is thus possible through the simple variations shown in FIGS. 6 and 7 to bring about variations in the manner in which the objects of the invention are achieved.

What is claimed is:

1. In a vehicle, endless track means, front and rear roll means around which front and rear ends of said endless track means are respectively guided, front support means supporting said front roll means for swivelling movement about a substantially upright axis, turning means operatively connected with said front support means for turning the latter about said axis for steering the vehicle at least in a turning range having turning radii substantially larger than a given minimum radius of turning of the vehicle, transmission means operatively connected to said rear roll means for automatically limiting turning thereof at least during turning of said front support means in said turning range to a degree which is substantially less than the degree of turning of said front support means, said transmission means including a rear support means supporting said rear roll means for swivelling movement about a substantially upright axis situated to the rear of the swivelling axis of the front roll means, and said transmission means also including structure connected between said front and rear support means for transmitting turning to said rear support means and said rear roll means therewith only after said front support means and said front roll means therewith have turned through a given angle, said transmission means including a front roller and a pair of rear rollers respectively situated at the corners of a triangle, said front support means being formed with a slot receiving said front roller for transmitting turning of said front support means to said transmission means, the latter being swingably connected to said rear support means at a point between said pair of rear rollers, and guide means guiding said rear rollers for turning along a circle whose center is in said point during turning of said front support means within said given angle and for then guiding said rear rollers for movement transversely of the vehicle for laterally shifting said point to swing said rear support means after said front support means has turned through said given angle.

2. The combination of claim 1 and wherein said transmission means is of substantially T-shaped configuration having a rear transverse leg which carries said pair of rear rollers and a longitudinal leg extending forwardly from said rear transverse leg and carrying said front roller.

3. The combination of claim 1 and wherein said turning means is operatively connected to said transmission means for turning the latter to transmit turning movement to said front support means, said slot having a rear open end beyond which said front roller turns when said front support means has turned through said given angle for providing turning of said rear roll means without continued turning of said front roll means after the latter has turned through said given angle.

* * * * *